(12) United States Patent
Puente et al.

(10) Patent No.: US 8,725,808 B2
(45) Date of Patent: May 13, 2014

(54) METHOD FOR TRANSFERRING DATA BETWEEN A FIRST DEVICE AND A SECOND DEVICE

(75) Inventors: Pablo Puente, Munich (DE); David Brenner, Plano, TX (US); Paul Sisler, Louisville, KY (US); John Wurth, Louisville, KY (US)

(73) Assignee: Intel Mobile Communications GmbH, Neubiberg (DE)

( * ) Notice: Subject to any disclaimer, the term of this patent is extended or adjusted under 35 U.S.C. 154(b) by 48 days.

(21) Appl. No.: 13/468,054

(22) Filed: May 10, 2012
(Under 37 CFR 1.47)

(65) Prior Publication Data

US 2013/0304815 A1 Nov. 14, 2013

(51) Int. Cl.
*G06F 15/16* (2006.01)
*G06F 12/00* (2006.01)

(52) U.S. Cl.
USPC ........................................ 709/204

(58) Field of Classification Search
USPC .......... 709/203–204, 217–218, 223–229, 250
See application file for complete search history.

(56) References Cited

U.S. PATENT DOCUMENTS

| | | | |
|---|---|---|---|
| 7,257,811 B2 * | 8/2007 | Hunt et al. ...................... | 718/1 |
| 7,774,020 B2 | 8/2010 | Songer | |
| 7,786,935 B2 | 8/2010 | Songer et al. | |
| 2005/0235278 A1 * | 10/2005 | Wu et al. ...................... | 717/168 |
| 2007/0275683 A1 | 11/2007 | Songer et al. | |
| 2008/0167050 A1 | 7/2008 | Songer et al. | |
| 2008/0168030 A1 | 7/2008 | Songer | |
| 2009/0055601 A1 * | 2/2009 | McKenney et al. ........... | 711/153 |
| 2009/0175561 A1 | 7/2009 | Lankswert | |
| 2010/0162271 A1 * | 6/2010 | Arimilli et al. ................ | 719/319 |
| 2011/0191627 A1 * | 8/2011 | Koning et al. ................. | 714/5.1 |
| 2012/0036334 A1 * | 2/2012 | Horman et al. ................ | 711/165 |
| 2012/0110274 A1 * | 5/2012 | Rosales et al. ................ | 711/153 |

OTHER PUBLICATIONS http://developer.apple.com/library/ios/documentation/UIKit/Reference/UIPasteboard_Class/Reference.html.
http://msdn.microsoft.com/en-us/library/windows/desktop/ms648709(v=vs.85).aspx.
http://developer.android.com/reference/android/text/ClipboardManager.html.
http://cliptwin.intellicore.net.
http://floriandenis.net/cloudpaste.html.
http://directpaste.com/.
http://evernote.com/.

* cited by examiner

*Primary Examiner* — Zarni Maung

(57) ABSTRACT

According to an aspect of this disclosure, a method for transferring data from a first device to a second device is described, the method comprising: writing data into a data-sharing application of an operating system of the first device; requesting a data-sharing application to select a physical layer data transmission technology; the data-sharing application selecting a physical layer data transmission technology; connecting a data-sharing of an operating system of the second device via the selected physical layer data transmission technology; and transferring the data from the data-sharing application of the first device to the data-sharing application of the second device.

30 Claims, 13 Drawing Sheets

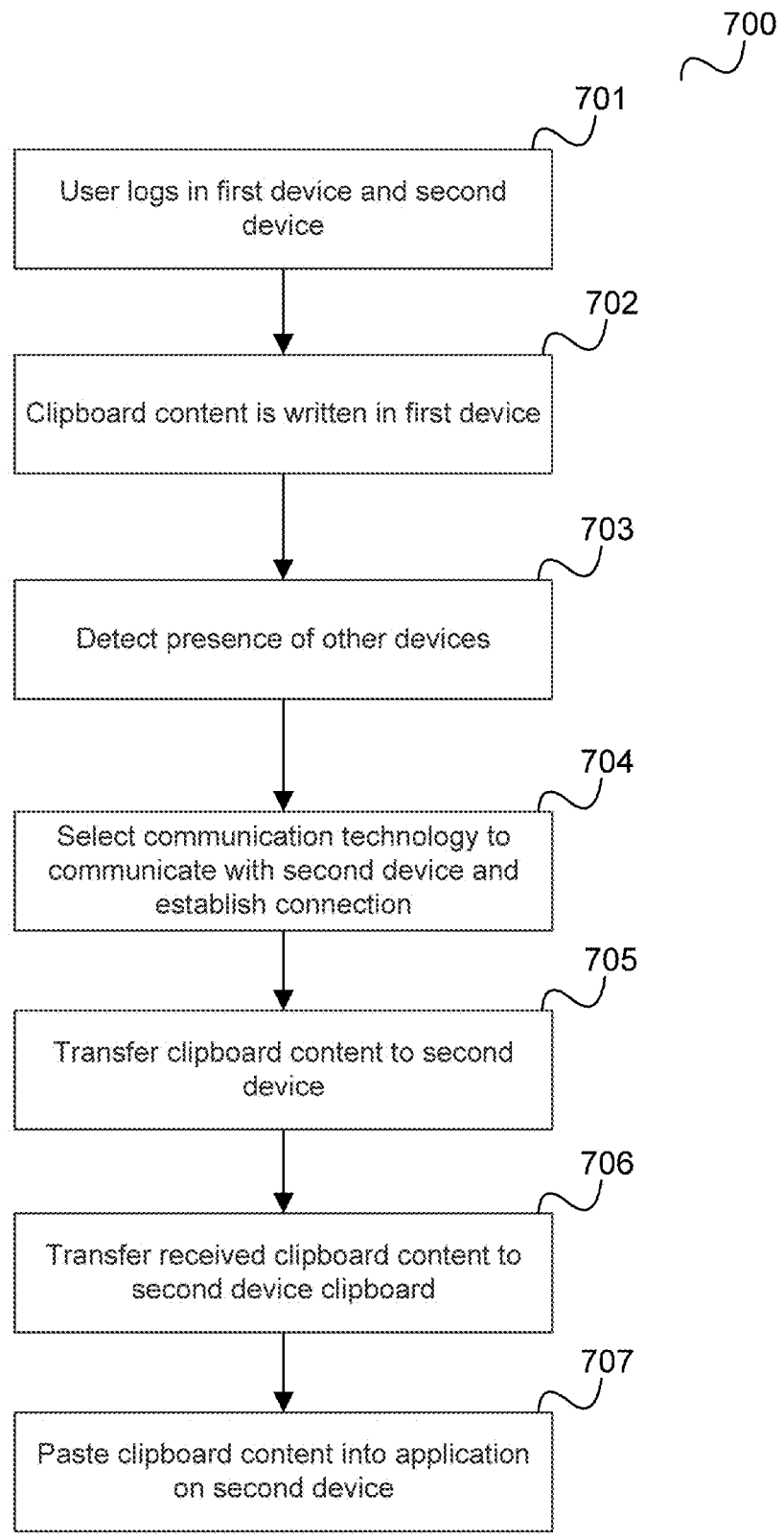

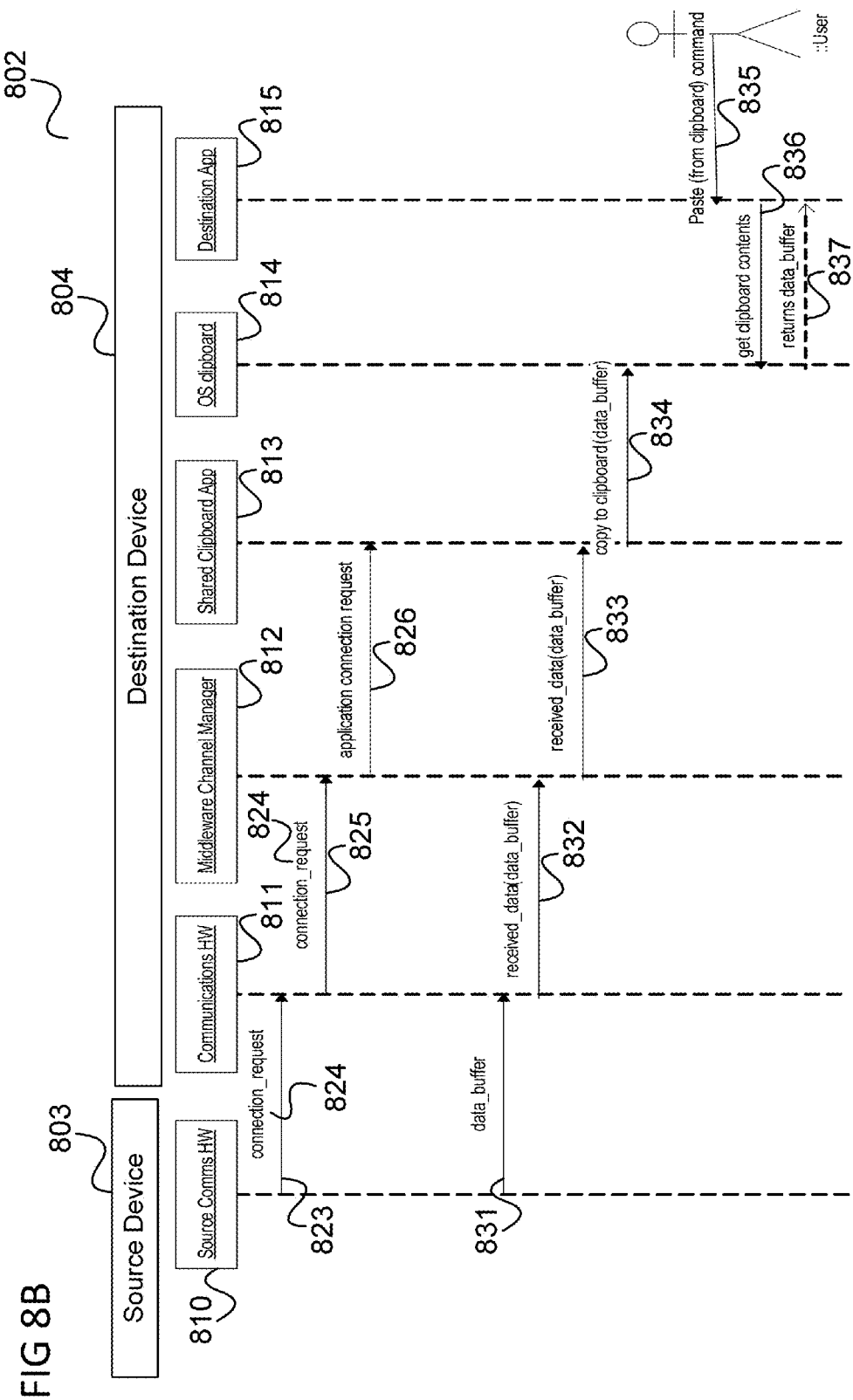

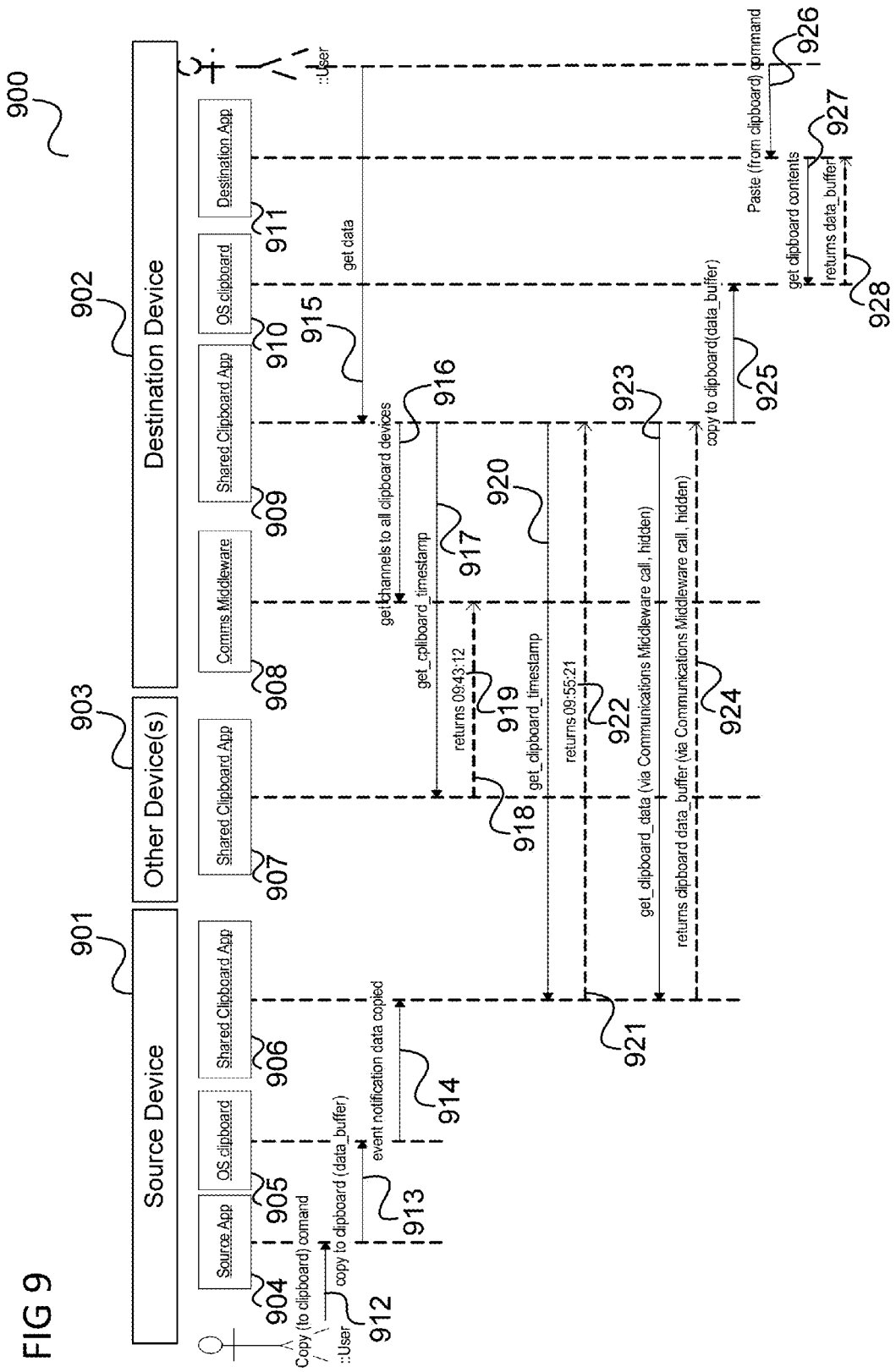

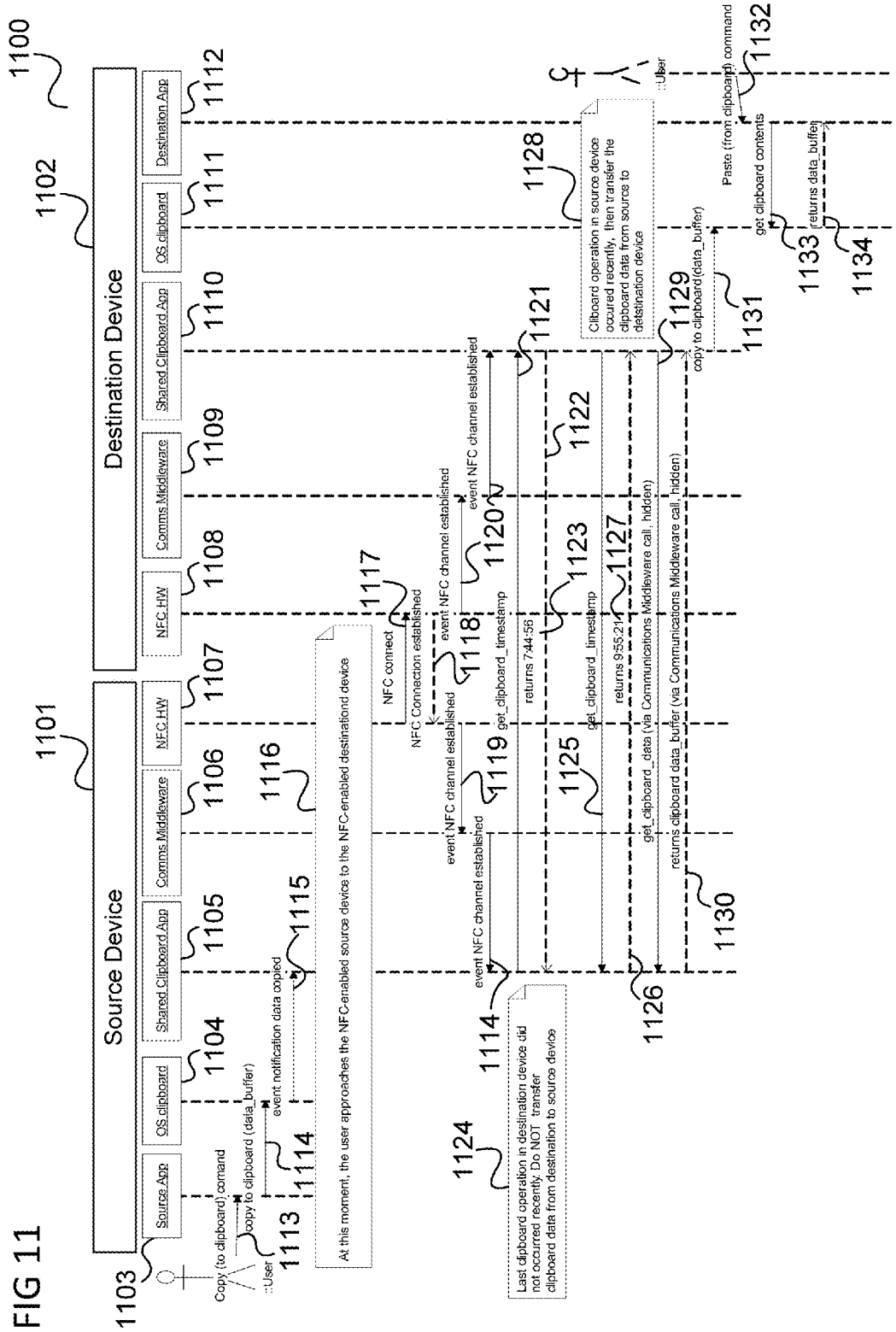

FIG 12A
FIG 12B
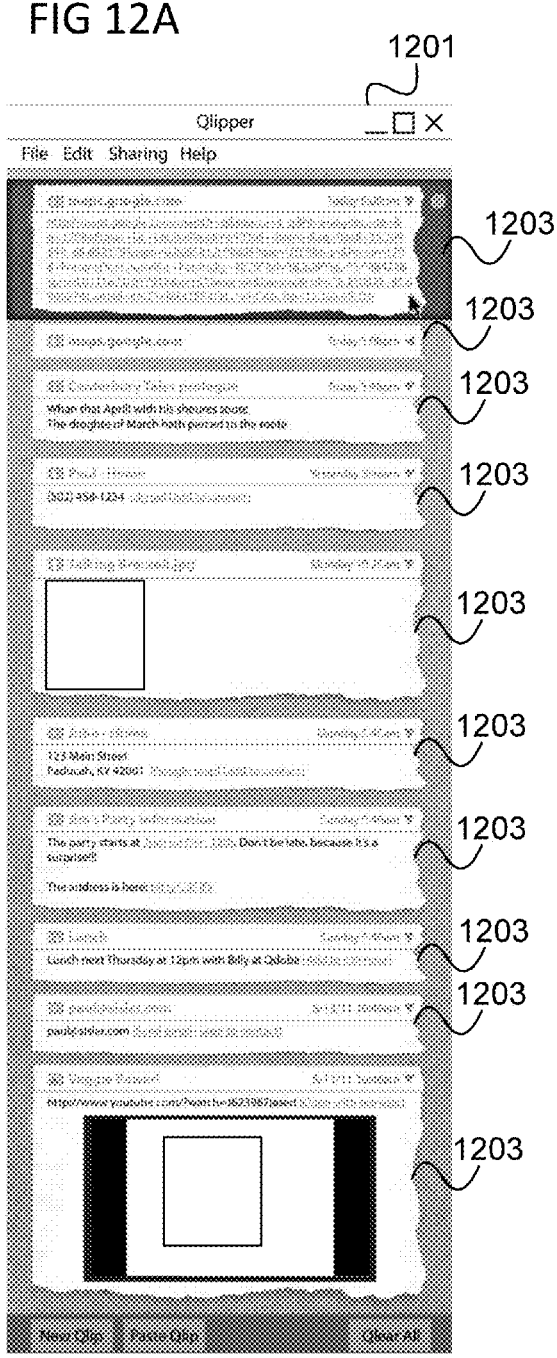
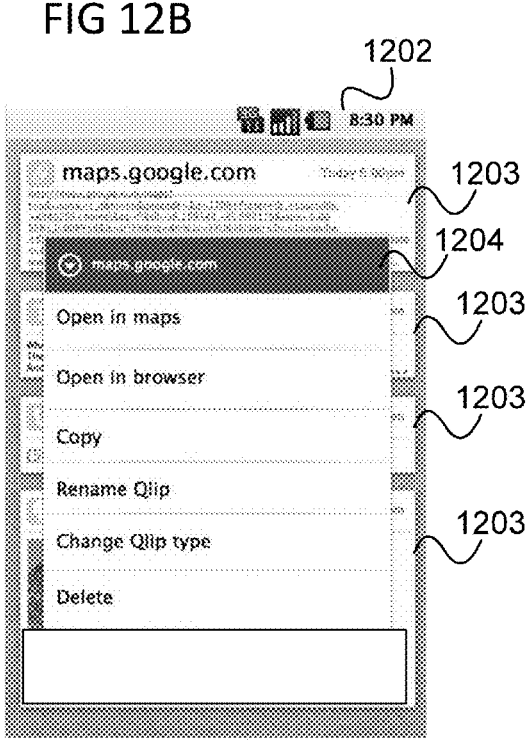

METHOD FOR TRANSFERRING DATA BETWEEN A FIRST DEVICE AND A SECOND DEVICE

TECHNICAL FIELD

The present invention relates generally to methods for transferring data from a first device to a second device and communication device.

BACKGROUND

With the increasing use of computing devices such as mobile phones (e.g. smartphones), tablet computers, notebook computers, desktop computers and the fact that a single user owns and uses a plurality of such devices, the quick and simple transfer of information between such computing devices (e.g. between any kind of applications running on two different computing devices) is often needed or desired.

Typically, software applications do not share a common communication interface or protocol. Thus, it may not be possible to directly exchange information between software applications running on different computing devices if the software applications have not been specifically designed to support this.

For transferring data from a first application (also referred to as source application) running on a first computing device (also referred to as source device) to a second application (also referred to as destination application) running on a second computing device (also referred to as destination device), the following mechanisms may for example be used:

1) File export/import: Data is exported from the source application into a file in the source device, the file is transferred from the source device to the destination device and the file is imported into the destination application in the destination device. The transfer of the file can for example be performed through a) a physical storage device (e.g. a USB Memory, a Memory Card, an external hard disk, etc.) or b) through a data communication link (USB cable, Ethernet Cable, Bluetooth, WLAN, Internet, etc.) using a file transfer application or a messaging application.

This, however, requires file storage availability: Due to file storage limitations or permission constraints this might not be possible. Further, this requires extra steps for the user: find a location to create the file in the source device file system, open a file transfer or messaging application, finding the transferred file it in the destination device file system. Additionally, this approach typically creates temporary files in source and destination device that the user has to take care of cleaning. The files created in the source device and the destination device may introduce security and privacy problems. Even if they are deleted by the user it is possible to recover deleted files from storage media.

2) Embedding the data into a message (Email, Chat or similar): The user exports (copies) the data from the source application to the clipboard of the operating system of the source device. A communication application (e.g. an email client) is opened and the data is imported (e.g. pasted) into a message (e.g. an email message). The message is sent, e.g. to the user's own email address or to another address. The user opens the messaging application in the destination device and copies the data into the clipboard of the operating system of the destination device. Then in the destination application a paste operation may be used to supply the data to the destination application running on the destination device.

This approach requires connectivity to a central messaging server from both the source device and the destination device. If this server is remote this might incur extra costs for the user. Messaging Internet servers are typically operated by $3^{rd}$ party companies and it is typically difficult to ensure the security and privacy of messages sent through them. Message encryption may thus be needed adding extra steps for the user. Additionally, for example the user may have to delete later the message from their sent or inbox messaging application folders.

3) Cloud bulletin board: The user copies data from a source application to a bulletin board desktop or web application. The data is stored in a cloud server (e.g. typically a server in the Internet). The user opens the bulletin board application in the destination device and copies the data into the local clipboard of the operating system of the destination device.

This approach requires connectivity to the cloud server. Connectivity might not be available on remote or crowded areas (e.g. in a stadium). Further, this approach requires accepting a contract with a $3^{rd}$ party cloud service provider. Additionally, costs might be incurred for big data amounts. Further, the security and privacy of the data may not be ensured such that the user may be required to take extra steps to encrypt and decrypt the data.

SUMMARY

According to one aspect of this disclosure, a method for transferring data between a first device and a second device is provided, the method comprising writing data into a data-sharing application of an operating system of the first device; requesting a data-sharing application to select a physical layer data transmission technology; the data-sharing application selecting a physical layer data transmission technology; connecting a data-sharing application of an operating system of the second device via the selected physical layer data transmission technology; and transferring the data from the data-sharing application of the first device to the data-sharing application of the second device.

According to another aspect of this disclosure, a (communication) device according to the above method for transferring data from a first device to a second device is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of this disclosure of the invention are described with reference to the following drawings, in which:

FIG. 7 shows a flow diagram according to an aspect of this disclosure.

FIGS. 8a, 8b show a message flow diagram according to an aspect of this disclosure.

FIG. 9 shows a message flow diagram according to an aspect of this disclosure.

FIG. 11 shows a message flow diagram according to an aspect of this disclosure.

FIGS. 12A and 12B show user interfaces according to an aspect of this disclosure.

DESCRIPTION

Figure 1:
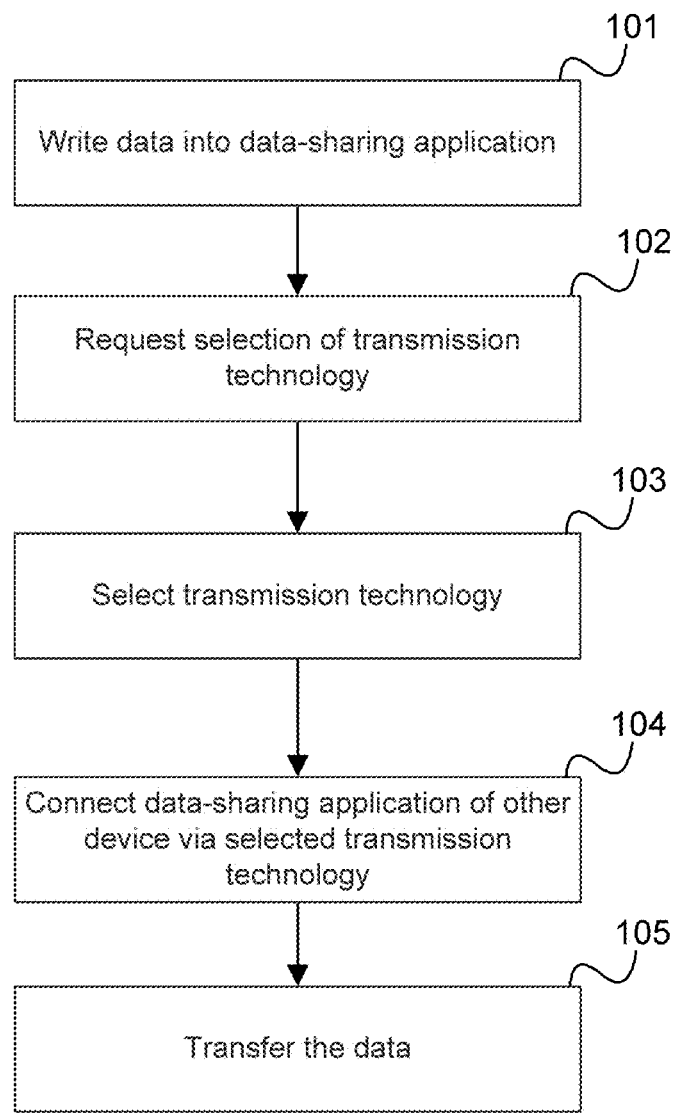
FIG. 1 shows a flow diagram according to an aspect of this disclosure.

The following detailed description refers to the accompanying drawings that show, by way of illustration, specific details and aspects of this disclosure in which the invention may be practiced.

The word "exemplary" is used herein to mean "serving as an example, instance, or illustration". Any aspect of this disclosure or design described herein as "exemplary" is not necessarily to be construed as preferred or advantageous over other aspects of this disclosure or designs.

A "circuit" may be understood as any kind of a logic implementing entity, which may be hardware, software, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as, e.g. Java. Any other kind of implementation of the respective functions which will be described in more detail below may also be understood as a "circuit".

The terms "coupling" or "connection" are intended to include a direct "coupling" or direct "connection" as well as an indirect "coupling" or indirect "connection" respectively.

The term "protocol" is intended to include any piece of software and/or hardware, that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

The communication protocol layers and its respective entities which will be described in the following may be implemented in hardware, in software, in firmware, or partially in hardware, and/or partially in software, and/or partially in firmware. One or more communication protocol layers and its respective entities may be implemented by one or more circuits. At least two communication protocol layers may be commonly implemented by one or more circuits.

In order to better provide data sharing among devices, a cross-device data-sharing application is provided which connects the data-sharing applications of the operating systems of multiple computing devices. This for example allows the user of the devices to copy data in one device and paste it into an application of another device. It removes from the user the burden of importing and exporting data between applications. According to one aspect of this disclosure, the cross-device data-sharing approach is based on an application referred to as "data-sharing application" running in all devices whose Operating System clipboards should be connected.

The data-sharing application uses the API (Application Programming Interface) of the data-sharing application of the operating system of the devices to 1) read data 2) write data from the data-sharing application of the operating system and 3) get notifications on the event of the user copying data in the operating system data-sharing application.

A method for transferring data from a first device to a second device which may include the usage of a data-sharing application is illustrated in FIG. 1.

FIG. 1 shows a flow diagram 100 according to an aspect of this disclosure.

The flow diagram 100 illustrates a method for transferring data from a first device to a second device.

In 101, data is written into a data-sharing application of an operating system of the first device (e.g. a clipboard of the operating system of the first device), e.g. by an application running on the first device.

In 102, a data-sharing application, is requested, e.g. by a controller of the first device, to select a physical layer data transmission technology.

In 103 the data-sharing application selects a physical layer data transmission technology.

In 104 a data-sharing application of an operating system of the second device (e.g. a clipboard of the operating system of the second device) is connected via the selected physical layer data transmission technology, e.g. by a communication middleware of the first device.

In 105 the data is transferred, e.g. by the communication middleware of the first device, from the data-sharing application of the first device to the data-sharing application of the second device.

In other words, an application (referred to as data-sharing application or shared clipboard application, for example) is provided in a first device (source device) which selects a transmission technology to transfer all or some of the operating system data-sharing application content of the first device to a second device. According to the selection, data from the operating system clipboard is transferred to the clipboard of the second device. In other words, the clipboard between two devices is synchronized wherein a shared clipboard applications which is located in a higher communication layer than the operating system, selects a physical layer transmission technology for the synchronization.

The architecture layer can for example be understood as an architecture layer according to the OSI (Open Systems Interconnection) reference model.

According to another aspect of this disclosure, (communication) devices according to the above method for transferring data from a first device to a second device and a method for receiving data are provided.

It should be noted that aspects of this disclosure described in context of the transferring method are analogously valid for the devices and the receiving method and vice versa.

The operating system may for example be a Windows (or Windows based) operating system or, a Unix/Linux (or Unix/Linux based) operating system or a MacOS. The operating system may for example be an operating system for handheld devices such as iOS, Android, Windows Mobile, etc.

By way of example, the physical layer data transmission technology may be the physical layer data transmission technology of one of the following communication technologies:

a Short Range radio communication technology (which may include e.g. a Bluetooth radio communication technology, an Ultra Wide Band (UWB) radio communication technology, and/or a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), a Metropolitan Area System radio communication technology (which may include e.g. a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface, a Cellular Wide Area radio communication technology (which may include e.g. a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)).

Short Range radio communication technologies may include the following Short Range radio communication technology sub-families:

personal area networks (Wireless PANs) radio communication sub-family, which may include e.g. IrDA (Infrared Data Association), Bluetooth, UWB, Z-Wave and ZigBee; and wireless local area networks (W-LANs) radio communication sub-family, which may include e.g. HiperLAN/2 (High PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput).

Metropolitan Area System radio communication technology families may include the following Metropolitan Area System radio communication technology sub-families:

a Wireless campus area networks (W-CANs) radio communication sub-family, which may be considered one form of a metropolitan area network, specific to an academic setting, and which may include e.g. WiMAX, WiPro, HiperMAN (High Performance Radio Metropolitan Area Network), or IEEE 802.16m Advanced Air Interface; and a Wireless metropolitan area networks (W-MANs) radio communication sub-family, which may be limited to a room, building, campus or specific metropolitan area (e.g., a city) respectively, and which may include e.g. WiMAX, WiPro, HiperMAN (High Performance Radio Metropolitan Area Network), or IEEE 802.16m Advanced Air Interface.

Cellular Wide Area radio communication technologies may also be considered as Wireless Wide Area Network (Wireless WAN) radio communication technologies.

The physical layer data transmission technology may also be a physical layer data transmission technology for wireline communication (e.g. communication via a fixed line network), e.g. according to Ethernet, USB (Universal Serial Bus), Firewire etc.

According to one aspect of this disclosure, the data is transferred from the data-sharing application of the first device to the data-sharing application of the second device by means of the selected physical layer data transmission technology.

According to one aspect of this disclosure, the data-sharing application includes a middleware component configured to select the physical layer data transmission technology.

The data-sharing application may include a data-sharing interface for receiving the data from the data-sharing application of the operating system of the first device.

According to one aspect of this disclosure, the data is written into the data-sharing application of the operating system of the first device by a software application running on the first device.

The data is for example written into the data-sharing application of the operating system of the first device in response to an operation or instruction by a user of the first device. For example, the operation or instruction is a copy or a cut operation or instruction.

For example, the first device and/or the second device are communication terminals.

According to one aspect of this disclosure, the first device and/or the second device are mobile communication terminals.

According to one aspect of this disclosure, the physical layer data transmission technology is selected from a plurality of physical layer data transmission technologies supported by the first device.

The physical layer data transmission technology may be selected as a physical layer data transmission technologies supported by the second device.

The physical layer data transmission technology may be selected as a physical layer data transmission technology according to which a communication connection between the first device and the second device can be established.

According to one aspect of this disclosure, the physical layer data transmission technology is a wireless physical layer data transmission technology.

The physical layer data transmission technology is for example a wireline physical layer data transmission technology.

According to one aspect of this disclosure, the data-sharing application of the operating system of the second device is connected via a communication connection based on the selected physical layer data transmission technology.

The communication connection is for example peer-to-peer communication connection.

The method may further include detecting whether the signal strength of a signal received from the second device is above a predetermined threshold and performing the connecting and the transferring if it has been detected that the signal strength of above the predetermined threshold.

According to one aspect of this disclosure, the method further includes determining the second device from a list of second devices.

The method may include performing the requesting, selecting, connecting and transferring for each of a plurality of second devices.

The physical layer data transmission technology is for example a Personal Area Network physical layer data transmission technology, a Local Area Network physical layer data transmission technology or a Wide Area Network physical layer data transmission technology.

The data-sharing application may include a bulletin board shared between the first device and the second device.

The data-sharing application is for example implemented in a device architecture layer above the operating system of the first device.

Figure 2:
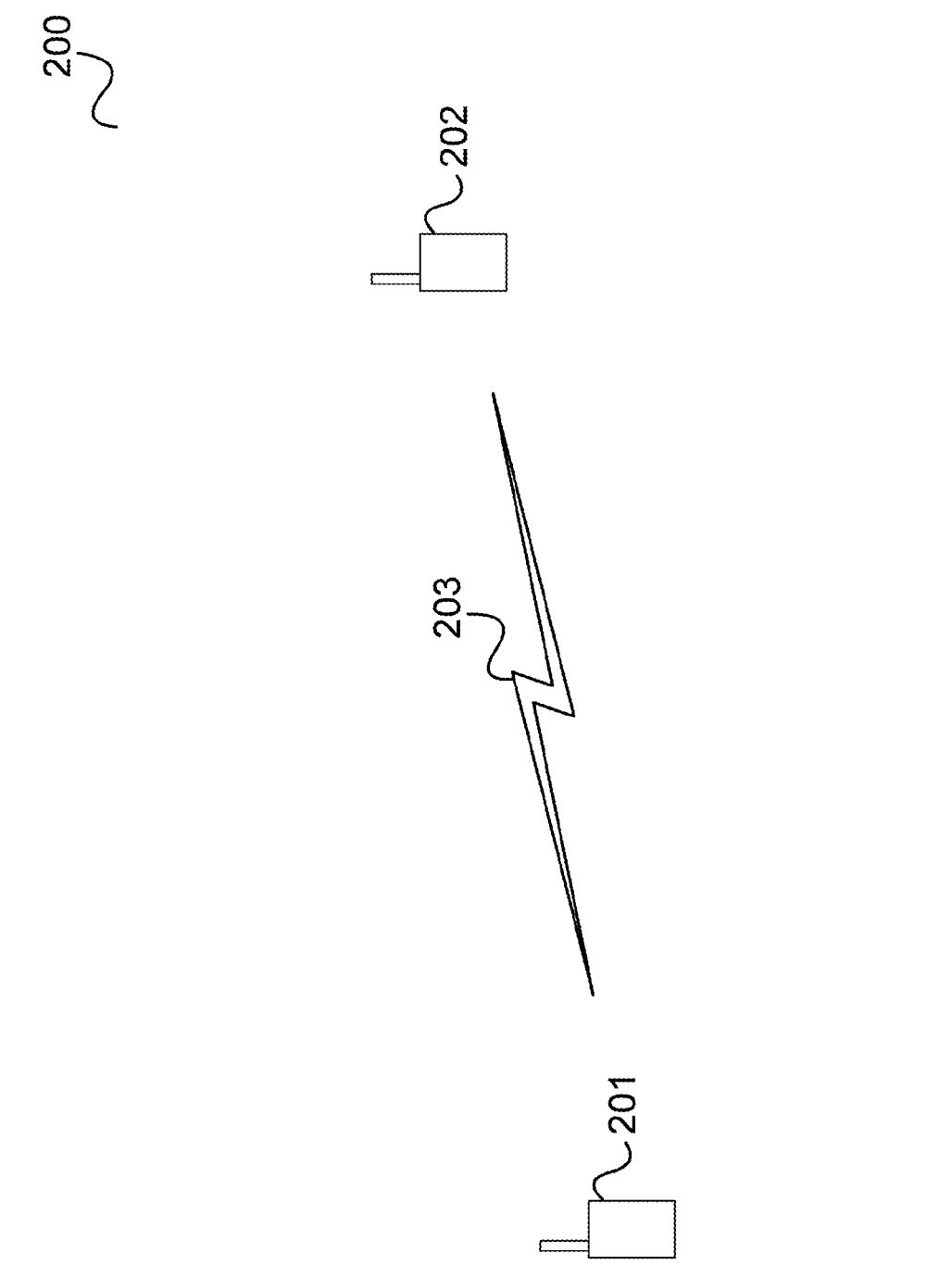
FIG. 2 shows a communication arrangement according to an aspect of this disclosure.

FIG. 2 shows a communication arrangement 200 according to an aspect of this disclosure.

The communication arrangement 200 includes a first computing device 201 and a second computing device 202. The first computing device 201 and the second computing device 202 may for example be mobile communication terminals. The first computing device 201 and the second computing device 202 may be connected via a communication connection 203, e.g. a wireless communication connection, for example in case that the first computing device 201 and the second computing device 202 are mobile communication terminals. Examples for possible components and configurations of the first computing device 201 and the second computing device 202 are given in the following with reference to FIGS. 3 and 4.

Figure 3:
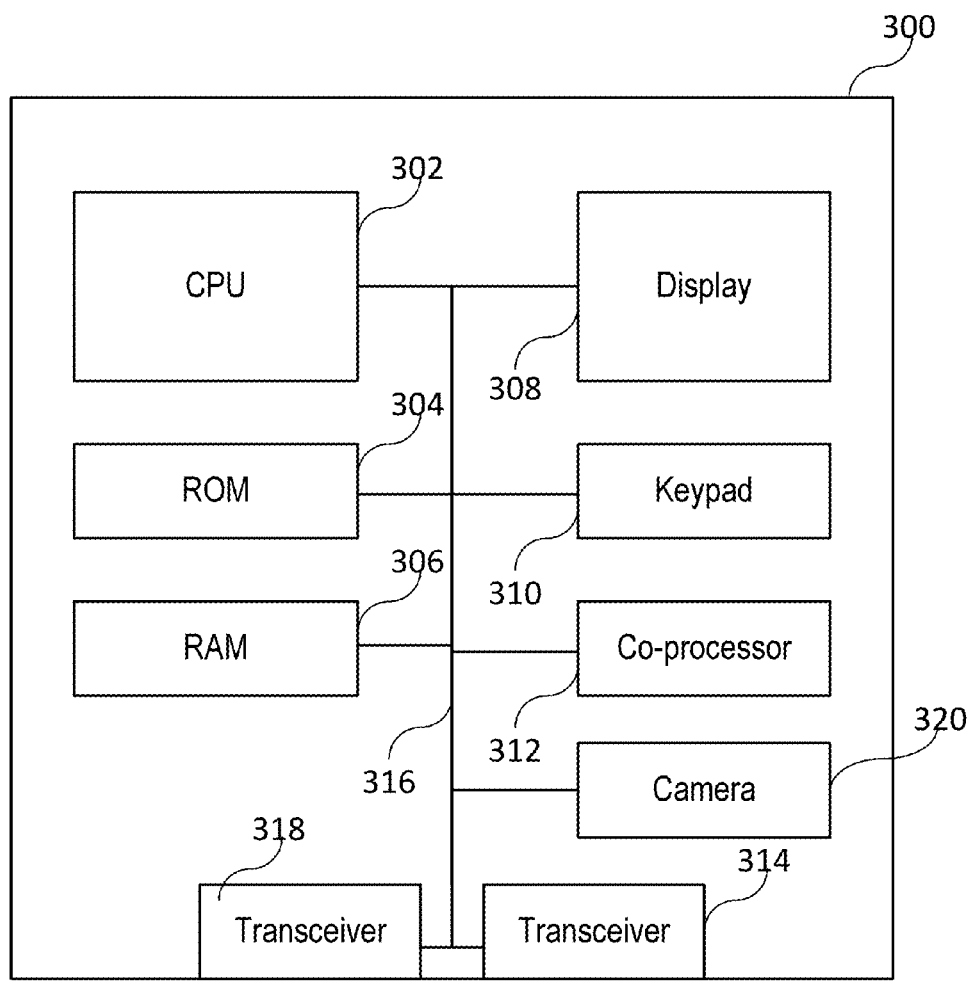
FIG. 3 shows a communication device, e.g. corresponding to the first computing device, in accordance with various aspects of the disclosure.

FIG. 3 shows a communication device 300, e.g. corresponding to the first computing device 201, in accordance with various aspects of the disclosure.

For example, the first computing device 201 is a mobile radio communication device configured in accordance with LTE and/or other 3GPP mobile radio communication technologies.

In various aspects of the disclosure, the communication device 300 may include a processor 302, such as e.g. a microprocessor (e.g. a central processing unit (CPU)) or any other type of programmable logic device (which may for example act as controller). Furthermore, the communication device 300 may include a first memory 304, e.g. a read only memory (ROM) 304 and/or a second memory 306, e.g. a random access memory (RAM) 306. Moreover, the communication device 300 may include a display 308 such as e.g. a touch sensitive display, e.g. a liquid crystal display (LCD) display or a light emitting diode (LED) display, or an organic light emitting diode (OLED) display. However, any other type of display may be provided as the display 308. The communication device 300 may in addition include any other suitable output device (not shown) such as e.g. a loudspeaker or a vibration actuator. The communication device 300 may include one or more input devices such as keypad 310 including a plurality of keys. The communication device 300 may in addition include any other suitable input device (not shown) such as e.g. a microphone, e.g. for speech control of the communication device 300. In case the display 308 is implemented as a touch sensitive display 308, the keypad 310 may be implemented by the touch sensitive display 308. Moreover, optionally, the communication device 300 may include a co-processor 312 to take processing load from the processor 302. Furthermore, the communication device 300 may include a first transceiver 314. The above described components may be coupled with each other via one or more lines, e.g. implemented as a bus 316. The first memory 304 and/or the second memory 306 may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory) or a CBRAM (Conductive Bridging Random Access Memory). The program code used to be executed and thereby to control the processor 302 (and optionally the co-processor 312) may be stored in the first memory 304. Data (e.g. the messages received or to be transmitted via the first transceiver 314) to be processed by the processor 302 (and optionally the co-processor 312) may be stored in the second memory 306. The first transceiver 314 may be configured such that it implements a Uu interface in accordance with LTE. The communication device 300 and the first transceiver 314 may also be configured to provide MIMO radio transmission.

Further, the communication device 300 may also include an additional second transceiver 318, for example supporting a different communication technology than the one supported by the first transceiver 314 e.g. a Wireless Local Area Network (WLAN) technology, e.g. a Personal Area Network (PAN) technology or any other desired wireless communication technology or wireline communication technology. Moreover, the communication device 300 may include a still image and/or video camera 320, configured to provide a video conference via the communication device 300.

Furthermore, the communication device 300 may include a Subscriber Identity Module (SIM), e.g. a UMTS Subscriber Identity Module (USIM) identifying a user and subscriber 216 of the communication device 300. The processor 302 may include audio processing circuits such as e.g. audio decoding circuit and/or audio encoding circuit, configured to decode and/or encode audio signals in accordance with one or more of the following audio encoding/decoding technologies: ITU G.711, Adaptive Multi-Rate Narrowband (AMR-NB), Adaptive Multi-Rate Wideband (AMR-WB), Advanced Multi-Band Excitation (AMBE), etc.

Figure 4:
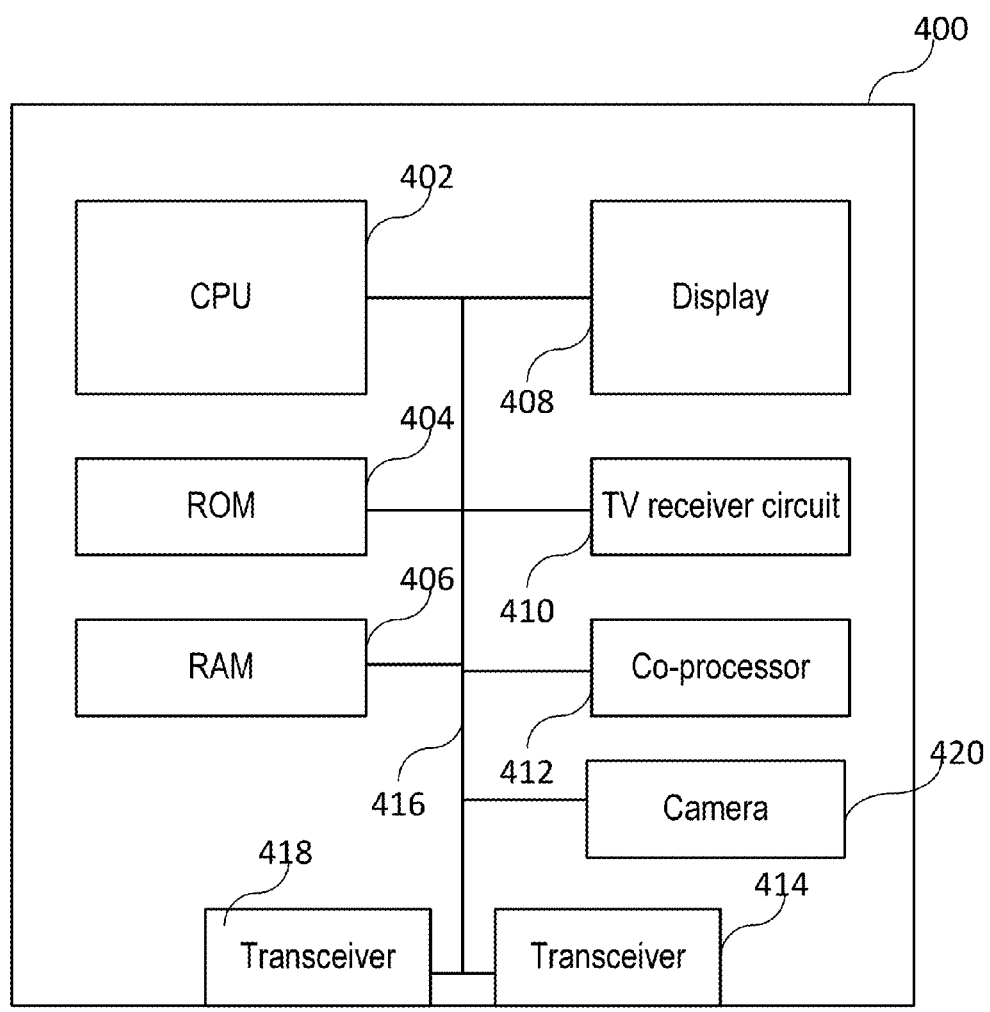
FIG. 4 shows a communication device, e.g. corresponding to the second computing device, in accordance with various aspects of the disclosure.

FIG. 4 shows a communication device 400, e.g. corresponding to the second computing device 202, in accordance with various aspects of the disclosure.

In various aspects of the disclosure, the communication device 400 may include a processor 402, such as e.g. a microprocessor (e.g. a central processing unit (CPU)) or any other type of programmable logic device (which may for example act as controller). Furthermore, the communication device 400 may include a first memory 404, e.g. a read only memory (ROM) 404 and/or a second memory 406, e.g. a random access memory (RAM) 406. Moreover, the communication device 400 may include a display 408 such as e.g. a touch sensitive display, e.g. a liquid crystal display (LCD) display or a light emitting diode (LED) display, or an organic light emitting diode (OLED) display. However, any other type of display may be provided as the display 308. The communication device 400 may in addition include any other suitable output device (not shown) such as e.g. a loudspeaker.

The communication device 400 may further include one or more input television (TV) receiver circuits 310 configured to receive and process TV signals. The one or more TV receiver circuits 310 may include video processing circuits such as e.g. video decoding circuit configured to decode video signals in accordance with one or more of the following video encoding technologies: Internation Telecommunication Union (ITU) H.261, ITU H.263, ITU H.264, Moving Pictures Experts Group (MPEG, e.g. MPEG 2, MPEG 4, and MPEG 7, etc.), Sub Quarter Common Intermediate Format (SQCIF), Quarter Common Intermediate Format (QCIF), Common Intermediate Format (CIF), Video Graphics Array (VGA), 4 Common Intermediate Format (4CIF), etc. The communication device 400 may in addition include any other suitable input device (not shown) such as e.g. a microphone, e.g. for speech control of the communication device 400. Moreover, optionally, the communication device 400 may include a co-processor 412 to take processing load from the processor 402.

Furthermore, the communication device 400 may include a first transceiver 414. The above described components may be coupled with each other via one or more lines, e.g. implemented as a bus 416. The first memory 404 and/or the second memory 406 may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory) or a CBRAM (Conductive Bridging Random Access Memory). The program code used to be executed and thereby to control the processor 402 (and optionally the co-processor 412) may be stored in the first memory 404. Data (e.g. the messages received or to be transmitted via the first transceiver 414) to be processed by the processor 402 (and optionally the co-processor 412) may be stored in the second memory 406. The first transceiver 414 may be configured such that it implements a Uu interface in accordance with LTE. The communication device 400 and the first transceiver 414 may also be configured to provide MIMO radio transmission.

Further, the communication device 400 may also include an additional second transceiver 418, which may be configured such that it supports a radio communication technology different from the one supported by the first transceiver 414, e.g. a Wireless Local Area Network (WLAN) technology, e.g. a Personal Area Network (PAN) technology or any other desired wireless communication technology or wireline communication technology. Moreover, the communication device 400 may include a still image and/or video camera 420, configured to provide a video conference via the second communication device 202. The one or more cameras 420 may include video processing circuits such as e.g. video encoding circuit, configured to encode video signals in accordance with one or more of the following video encoding technologies: Internation Telecommunication Union (ITU) H.261, ITU H.263, ITU H.264, Moving Pictures Experts Group (MPEG, e.g. MPEG 2, MPEG 4, and MPEG 7, etc.), Sub Quarter Common Intermediate Format (SQCIF), Quarter Common Intermediate Format (QCIF), Common Intermediate Format (CIF), Video Graphics Array (VGA), 4 Common Intermediate Format (4CIF), etc. Furthermore, the communication device 400 may also include a Subscriber Identity Module (SIM), e.g. a UMTS Subscriber Identity Module (USIM) identifying a user and subscriber 216 of the second communication device 202. The processor 402 may include audio processing circuits such as e.g. audio decoding circuit and/or audio encoding circuit, configured to decode and/or encode audio signals in accordance with one or more of the following audio encoding/decoding technologies: ITU G.711, Adaptive Multi-Rate Narrowband (AMR-NB), Adaptive Multi-Rate Wideband (AMR-WB), Advanced Multi-Band Excitation (AMBE), etc.

According to various aspects of this disclosure, a data-sharing application running on both the source device (e.g. the first computing device 201) and the destination device (e.g. the second computing device 202) handles the transfer of shared data from the source device to the destination device. The underlying architecture of the source device and the destination device according to one aspect of this disclosure is illustrated in FIG. 5.

Figure 5:
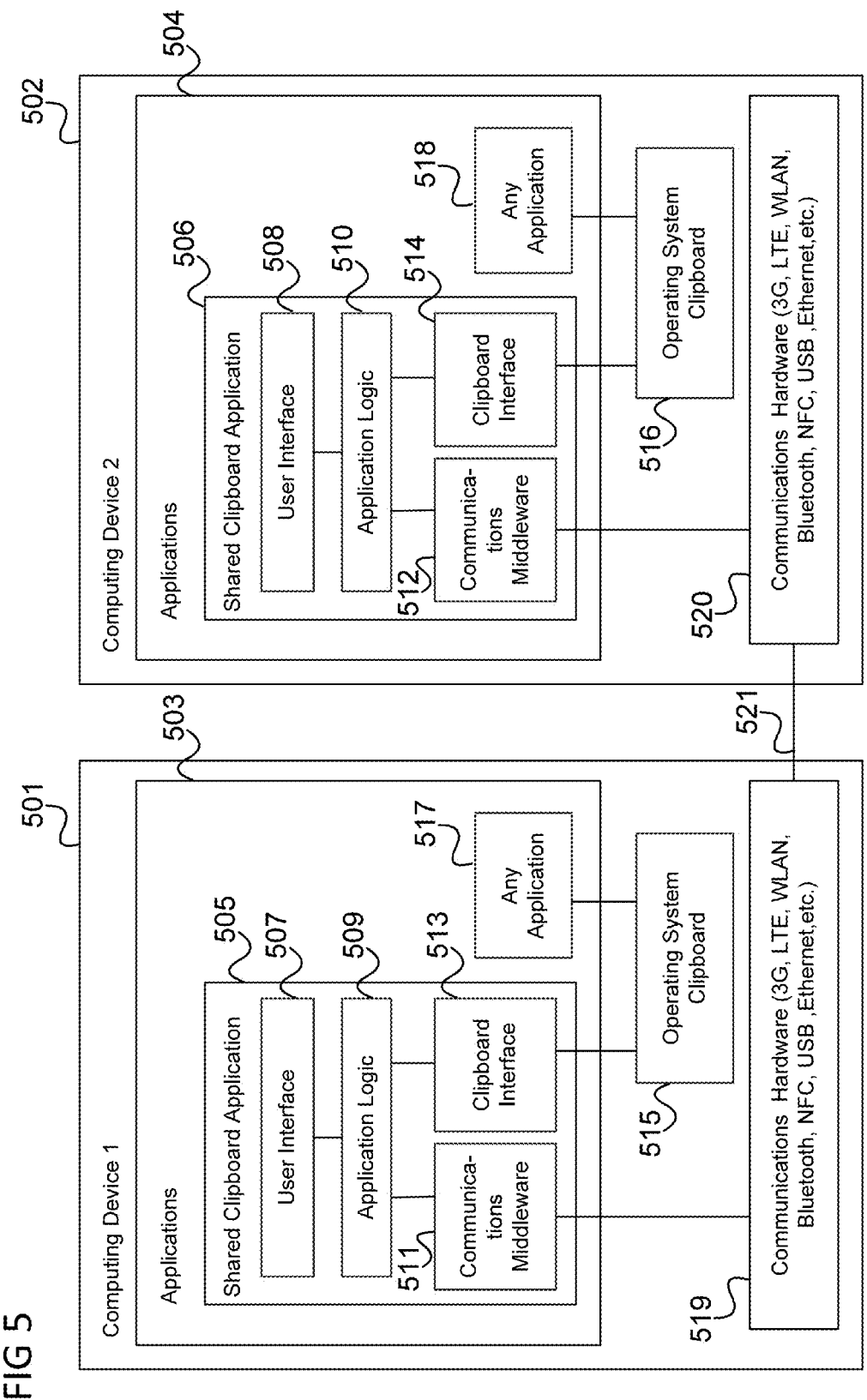
FIG. 5 shows a first computing device and a second computing device.

FIG. 5 shows a first computing device 501 and a second computing device 502.

The first computing device 501 for example corresponds to the first computing device 201, 300 and the second computing device 502 for example corresponds to the second computing device 202, 400. The first computing device 501 and the second computing device 502 are coupled via a communication connection 521 for example corresponding to the communication connection 203.

Applications 503, 504 may run on the first computing device 501 and the second computing device 502. For example, the applications are executed by the CPUs 302, 402 of the first computing device 501 and the second computing device 502. The applications include, both on the first computing device 501 (also referred to as source device) and the second computing device 502 (also referred to as destination device) a shared clipboard application 505, 506. The shared clipboard application 505, 506 includes a user interface 507, 508, an application logic 509, 510, a communication middleware 511, 512 and a clipboard interface 513, 514. The clipboard interface 513, 514 is an interface between the shared clipboard application 505, 506 and the clipboard of the operating system 515, 516 of the respective computing device 501, 502. The operating system clipboard 515 of the first computing device 501 may receive data from any application 517 among the applications 503 running on the first computing device 501 and the operating system clipboard 516 of the second computing device 502 may receive data from any application 518 among the applications 504 running on the second computing device 502, e.g. by a copy or cut operation carried out by the user in this application 517, 518. Vice versa, the operating system clipboard 515 of the first computing device 501 may provide data stored in the clipboard 515 to any application 517 among the applications 503 running on the first computing device 501 and the operating system clipboard 516 of the second computing device 502 may provide data stored in the clipboard 516 to any application 518 among the applications 504 running on the first computing device 502, e.g. by a paste operation carried out by the user in this application 517, 518.

The first computing device 501 and the second computing device 502 further include communication hardware 519, 520, for example corresponding to the transceivers 314, 318, 414, 418 providing radio communication functionality, e.g. a communication protocol stack, including physical layer data transmission technologies according to various communication standards, e.g. 3G, LTE, WLAN, Bluetooth, NFC (Near Field Communication), USB, Ethernet etc. The communication hardware 519, 520 for example provides the communication connection 521.

According to one aspect of this disclosure, the shared clipboard application 505, 506 running in both the source device 501 and the destination device 502 extracts the data from the source device operating system clipboard 515 and transfers it to the destination device shared clipboard application 506 which copies the data into the destination device operating system clipboard 516.

It should be noted that the second computing device 502 may also act as the in this way and that the first computing device 501 may also act as the destination device in this way, i.e. the computing device 501, 502 may change their roles in the course of time. Further, it should be noted that further computing devices may be present and connected to the first computing device 501 and the second computing device 502 which also include the shared clipboard application architecture as illustrated in FIG. 5 and which may also act as source or destination devices.

According to various aspects of this disclosure, different modes of operation may be supported by the shared clipboard application 505, 506:
1) Automatic: Any clipboard activity on any computing device is replicated to other machines where this user is logged-in.
2) Semiautomatic: The shared clipboard application running on a computing device copies the data from the last computing device where a copy occurred to the computing device.
3) One-To-Multiple: The user selectively identifies the computing devices to which the clipboard data should be sent. The computing devices may belong to the same user or to different users.
4) Proximity triggered: Use WLAN/Bluetooth received signal level or NFC connection to detect the source device from which to copy the data from.
5) Shared Bulletin Board: The user can paste from the clipboard and drag-and-drop data on a bulletin board user interface. The bulletin board might contain multiple clips. The contents of the bulletin board may automatically be synchronized by the shared clipboard application.

The shared clipboard application may use different communications mechanisms to transport the data from the source device 501 to the destination device 502, for example:
1) Personal Area Network (PAN): Bluetooth, NFC, USB, WLAN ad-hoc, Wifi Direct, etc.
2) Local Area Network (LAN): Ethernet, WLAN station/access point, etc.
3) Wide Area Networks (WAN): GPRS, 3G, LTE, WiMax, etc.

According to one aspect of this disclosure, internally, the shared clipboard application 505, 506 on a computing device 501, 502 uses the communication middleware component 511, 512 to abstract the connection details to the shared clipboard application 505, 506 running on another computing device 501, 502. The middleware component 511, 512 of the first computing device 501 and/or of the second computing device 502 may include a contact manager and a channel manager. It should be noted that in the examples described below, if only the contact manager or the channel manager is involved, the other one may be omitted for better simplicity. However, even if one is omitted in the description of an example, both the contact manager and the channel manager may be present in both the source device and the destination device such that the configuration is symmetrical.

The middleware component 511,512 for example supports the above communication technologies as mentioned above (e.g. PAN, LAN, WAN communication). According to one aspect of this disclosure, the middleware component 511, 512 is responsible for encrypting and decrypting the data to ensure security and privacy.

The communication middleware component 511, 512 may for example offer one or more of the following functionalities:
Provide a unified data communications API that can use different physical communication technologies (Bluetooth, Wifi station, Wifi adhoc, Wifi Direct (aka Wifi peer-to-peer), NFC, Ethernet, Cellular, etc.)
Secure the communication channels between applications (e.g. shared clipboard applications running on different computing devices 501, 502) by using encryption and authentication
Provide presence handling functionality for an application. Allows the application to know which devices or users are nearby, in which state they are (Busy, Away, Offline, etc.)
Manage the user devices and contacts list
Support the addition of a device or user to the contact list through different mechanisms (send invitation message, Bluetooth pairing, NFC connection)
Allow transfer of applications using the middleware between devices and users A contact manager of the middleware 512 of the destination device 502 may for example verify that it is the right recipient for clipboard content or manage multiple requests for clipboard synchronization.

According to one aspect of this disclosure, the middleware component 511, 512 of a computing device 501, 502 maintains a list of known computing devices for a given user and a list of user contacts using the same shared clipboard application.

Figure 6:
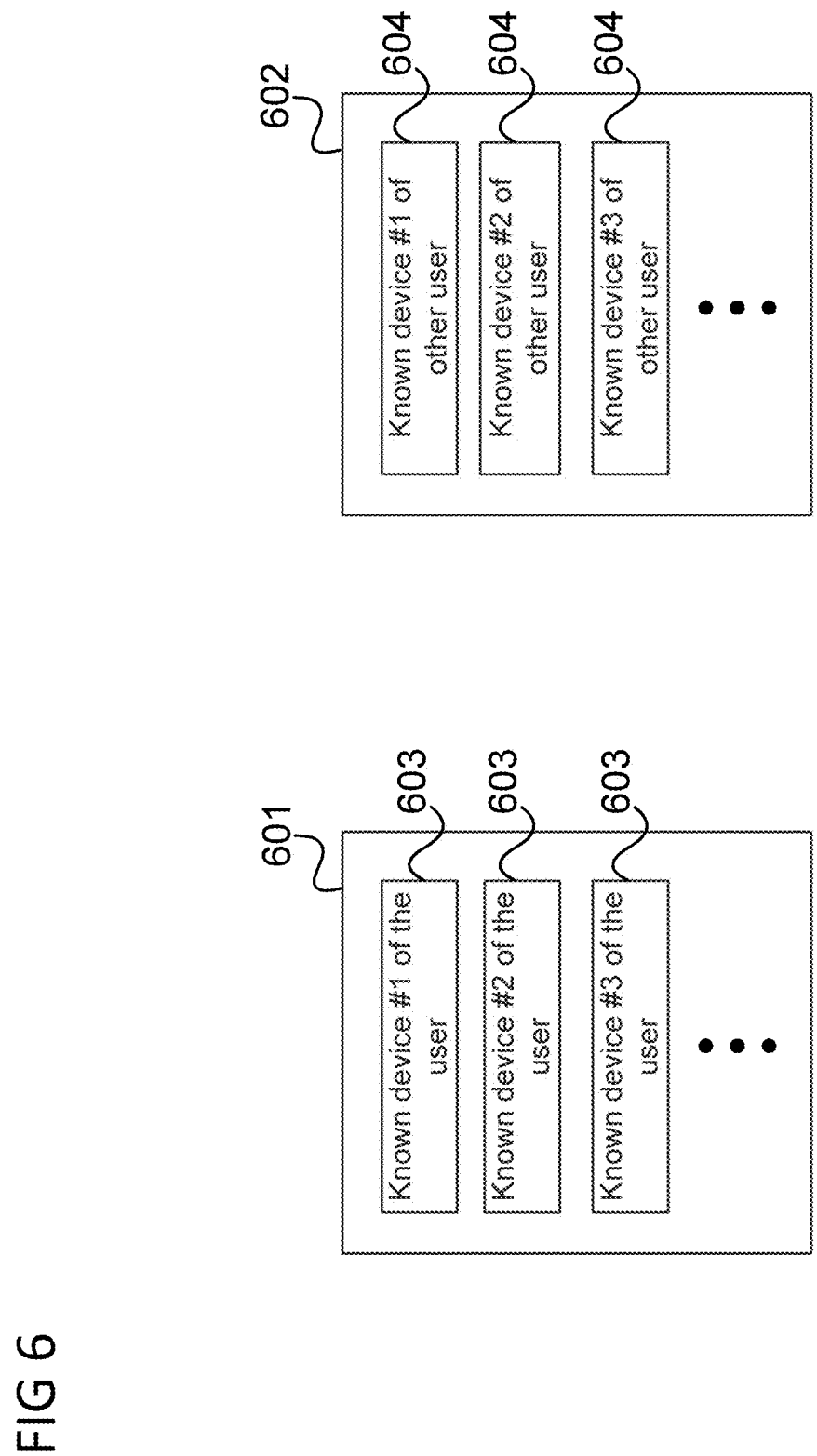
FIG. 6 shows a list of known computing devices of a user and a list of user contacts using the data-sharing application.

This is illustrated in FIG. 6.

FIG. 6 shows a list of known computing devices of a user 601 and a list of user contacts using the shared clipboard application 602.

The list of known computing devices of a user 601 for example includes a plurality of entries 603 specifying computing devices of the same user and also running the shared clipboard application. In other words, the list of known computing devices of a user 601 specifies other computing devices of the user to which the user might wish to send the clipboard content of the computing device or whose clipboard content should automatically be synchronized (depending on the mode of operation of the shared clipboard application selected by the user).

The list of user contacts using the shared clipboard application 602 for example includes a plurality of entries 604 specifying known computing devices of other users running the shared clipboard application. In other words, the list of user contacts using the shared clipboard application 602 specifies computing devices of other users which the user might wish to send the content of his computing device's clipboard.

According to one aspect of this disclosure, the middleware 511, 512 is responsible for the login of the user in a computing device and detects the availability and or proximity of computing devices (e.g. a known device of other user) in one of the contact lists 601, 602. The user may log in simultaneously in multiple computing devices through the shared clipboard application user interface 507, 508. The shared clipboard application 505, 506 can be used to exchange data between multiple devices belonging to a single user or between the devices of multiple users.

An example of a procedure is described in the following with reference to FIG. 7.

FIG. 7 shows a flow diagram 700 according to an aspect of this disclosure.

In 701, the user logs in on the first computing device 501 and on the second computing device 502.

In 702, an application 517 running on the first computing device 501 writes data into the operating system clipboard 515 of the first computing device 501.

In 703, the middleware component checks the list of known computing devices of the user 601 and the list of user contacts using the shared clipboard application 602 and detects whether a computing device corresponding to any of the entries of the lists 601, 602 is within communication range of the first computing device 501.

It is assumed that it is detected that the second communication device 502 is specified on the list of known computing devices of the user 601 and is detected as being in range.

As an example, it is assumed that the user chose the automatic mode of operation of the shared clipboard application. Accordingly, in 704, the middleware component 511 of the first computing device (acting as source device) selects a transmission technology to communicate with the second computing device (e.g. a physical layer data transmission technology) and establishes a communication connection 512 to the second computing device 502 based on the selected transmission technology.

In 705, the first computing device 501 transfers its clipboard contents to the second computing device 502.

In 706, the second computing device 502 stores the received clipboard contents in the operating system clipboard of the second computing device 502.

In 707, the user may paste the clipboard contents into any application 518 running on the second computing device 502.

According to various aspect of this disclosure, the middleware 511, 512 can work in two different architectures: Peer-to-Peer and Cloud based.

In the peer-to-peer architecture, the middleware 511, 512 in the shared clipboard application 505, 506 supports the establishment of pairing associations between shared clipboard applications using, for example, PAN and LAN communication. When data from the shared clipboard application of the source device has to be transferred it is directly sent to the destination device via the PAN or LAN. No server is involved in the communication.

In the cloud architecture, the middleware 511, 512 uses LAN or WAN mechanisms to connect to Internet servers. The shared clipboard application 505, 506 for example exchanges the clipboard data through a bulletin board that is hosted in the cloud servers. This architecture allows exchanging of clipboard data between devices without requiring both devices to be switched on at the same time.

In the following, aspects of this disclosure according to possible modes of operation of the shared clipboard application 503, 504 are described.

Automatic Synchronization

In case of automatic synchronization any clipboard activity on any user device is replicated in other devices where this user is logged-in.

The user may perform the following steps in case of automatic synchronization:

1. On the source device 501 use the application 517 copy command to copy the data to the local operating system clipboard 515. The Shared clipboard application 505 sends in the background the clipboard data automatically to the shared clipboard application 506 of the destination device (e.g. of all devices/users preconfigured to use the automatic clipboard synchronization). The shared clipboard application 506 of the destination device receives the clipboard content (which can be seen as clipboard update data) and copies the received data into the local operating system clipboard 516.
2. On the destination devices use the Paste command in any application A message flow according to an aspect of this disclosure for automatic synchronization is described in the following with reference to FIGS. 8a and 8b.

Figure 8A:
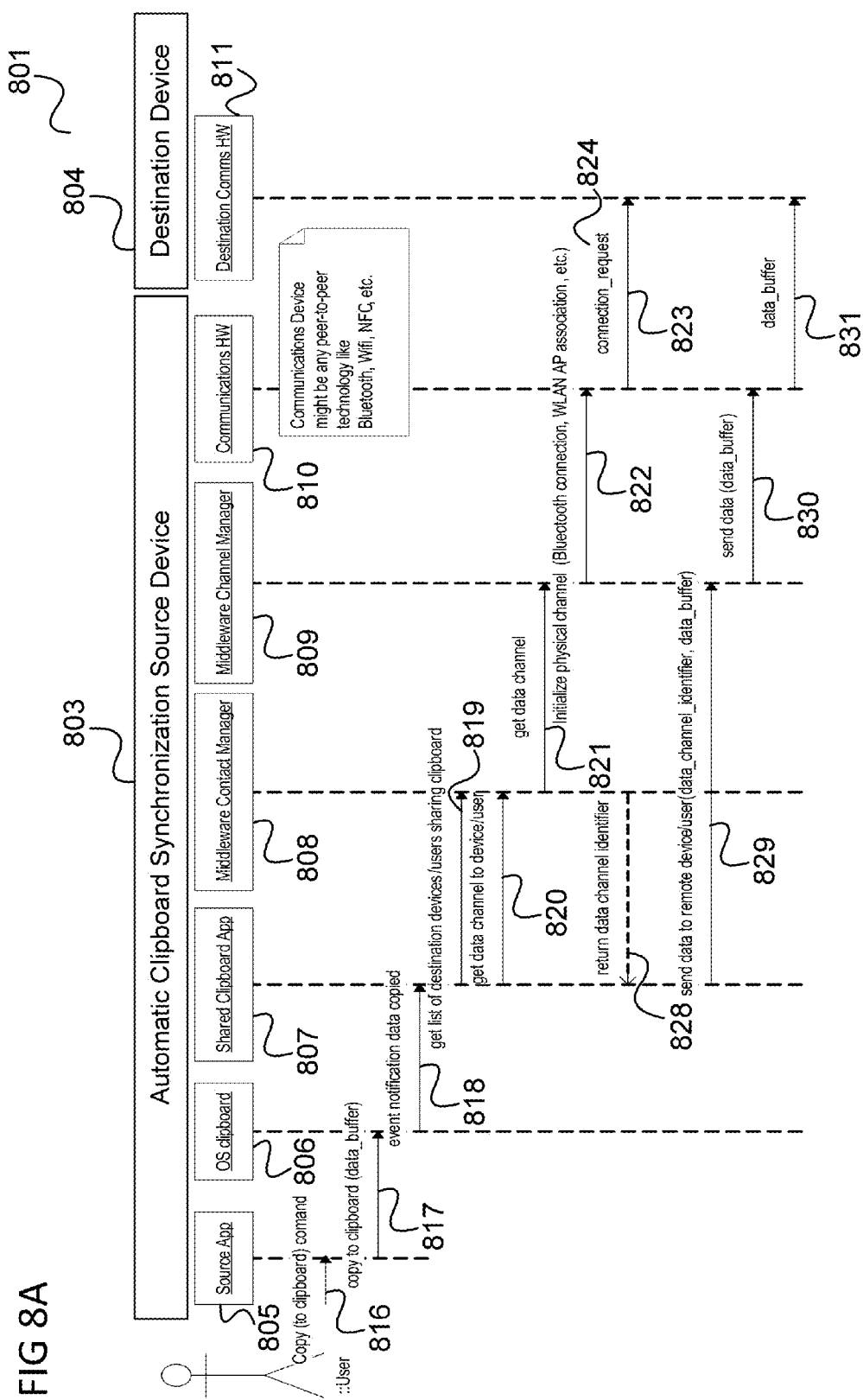

FIGS. 8a, 8b show an exemplary message flow diagram.

The message flow takes place between components of a source device 803, for example corresponding to the first computing device 501 and components of a destination device 804, for example corresponding to the second computing device 502.

The message flow diagram 800 is divided into a first part 801 shown in FIG. 8a including the message flow between the components of the source device and a second part 802 shown in FIG. 8b including the message flow between the components of the destination device.

In detail, the message flow takes place between a source application 805 of the source device 803, e.g. corresponding to the application 517, the operating system clipboard 806 of the source device 803, the shared clipboard application 807 of the source device 803, the middleware of the source device 803 (specifically the middleware contact manager 808 and the middleware channel manager 809), the communication hardware 810 of the source device 803, the communication hardware 811 of the destination device 804, the middleware channel manager 812 of the destination device 804, the shared clipboard application 813 of the destination device 804, the operating system clipboard 814 of the destination device 804 and a destination application 815 running on the destination device 804, e.g. corresponding to the application 518.

In 816, the user issues a copy command to the source application 805. In 817, the copied data is transferred to the source device clipboard 806. In 818, the shared clipboard application 807 of the source device 803 is notified about the copying operation. In 819, the shared clipboard application 807 of the source device 803 gets a list of possible destination devices, i.e. devices with which the clipboard should be shared, from the middleware contact manager 808 which retrieves this information for example from one of the lists 601, 602. When a device has been determined as destination device 804, the shared clipboard application 807 of the source device 803 requests the establishment of a communication connection to the destination device 804 from the middleware contact manager 808. The middleware contact manager 808 forwards this request to the middleware channel manager 809 in 821. In 822, the middleware channel manager 809 triggers the communication hardware 810 to establish a communication connection to the destination device 804.

In 823, the communication hardware 810 of the source device 803 sends a connection request message 824 to the communication hardware 811 of the destination device 804. The communication hardware 811 of the destination device 804 forwards the connection request message 824 to the middleware channel manager 812 of the destination device 804 in 825.

In 826, the middleware channel manager 812 of the destination device 804 sends an application connection request message 27 to the shared clipboard application of the destination device 804.

A communication connection (or communication channel) is then established between the source device 803 and the destination device 804. In 828, the middleware contact manager 808 of the source device 803 sends an identifier of the communication connection (or communication channel) 828 to the shared clipboard application 807 of the source device 803.

In 829, the shared clipboard application 807 of the source device 803 supplies the data to be sent to the destination device 804 (i.e. the clipboard content) to the middleware channel manager 809, together with the identifier of the communication connection. In 830, the middleware channel manager 809 supplies the data to the communication hardware 810 of the source device 803. The communication hardware 810 sends the data in 831 to the communication hardware 811 of the destination device 804.

In 832, the communication hardware 811 of the destination device 804 forwards the received data (i.e. clipboard content) to the middleware channel manager 812 of the destination device which supplies the received data in 833 to the shared clipboard application 813 of the destination device 804. The shared clipboard application 813 in 834 copies the received data into the operating system clipboard 814 of the destination device. The destination application 815 may, upon a paste command by the user in the destination application 815 in 835, request the clipboard contents from the clipboard 814 in 836. The clipboard contents as received from the source device 803 are then supplied to the destination application 815 in 837.

Semiautomatic Synchronization

In case of semiautomatic synchronization the shared clipboard application of the destination device copies only the data from the last source device where a copy clipboard operation occurred.

The user performs the following steps in case of semiautomatic synchronization:
1. On the source device use the application copy command to copy the data to the local clipboard
2. On destination device, open shared clipboard application
3. On the destination device select "Get Data" in the shared clipboard application. The shared clipboard application communicates with all user devices and gets the data from the shared clipboard application on the device where the last copy operation occurred.
4. On the destination device use the paste command in any application.

A message flow according to an aspect of this disclosure for semiautomatic synchronization is described in the following with reference to FIG. 9.

FIG. 9 shows a message flow diagram 900 according to an aspect of this disclosure.

The flow takes place between components of a source device 901, e.g. corresponding to the first computing device 501, components of a destination device 902, e.g. corresponding to the second computing device 502 and one or more other devices 903.

In more detail, the message flow takes place between a source application 904 on the source device 901, for example corresponding to the application 517, the operating system clipboard 905 of the source device 901, the shared clipboard application 906 of the source device 901, the shared clipboard application 907 of the one or more other devices 903 (i.e. the respective shared clipboard application 907 in the case of more than one other devices; in the following, the flow is described for the case of one other device; the flow is extended analogously for more than one other devices), the communication middleware 908 of the destination device 902, the shared clipboard application 909 of the destination device 902, the operating system clipboard 910 of the destination device 902 and a destination application 911 on the destination device 902, for example corresponding to the application 518.

In 912, the user issues a copy command to the source application 904. In 913, the copied data is transferred to the source device clipboard 905. In 914, the shared clipboard application 906 of the source device 901 is notified about the copying operation.

In 915, the users selects a "Get Data" command in the shared clipboard application 909 on the destination device 902. In 916, the shared clipboard application 909 on the destination device 902 requests the communication middleware 908 to establish communication connections to all devices which are candidates for supplying clipboard data (e.g. all known devices of the user as included in the list 601 that are switched on, into which the user is log in and which are within reception range of the destination device 902). In 917, the shared clipboard application 909 on the destination device requests a clipboard timestamp (i.e. an indication of the last change of the operating system clipboard) from the shared clipboard application 907 of one of the one or more other devices 903 and receives, in 918, a first clipboard timestamp 919 in response.

Similarly, in 920, the shared clipboard application 909 on the destination device requests a clipboard timestamp from the shared clipboard application 906 of the source device 901 and receives, in 921, a second clipboard timestamp 922 in response.

It is assumed that the second timestamp is newer than the first timestamp, i.e. that the source device 901 is the device with the most recent clipboard change.

Accordingly, in 923, the shared clipboard application 909 on the destination device 902 requests the clipboard content of the source device 901 from the shared clipboard application 906 of the source device 901. In 924, the shared clipboard application 906 of the source device 901 transmits its operating clipboard content to the shared clipboard application of the destination device 902.

The shared clipboard application 909 in 925 copies the received data into the operation system clipboard 910 of the destination device 902. The destination application 911 may, upon a paste command by the user in the destination application 911 in 926, request the clipboard contents from the clipboard 910 in 927. The clipboard contents as received from the source device 901 are then supplied to the destination application 911 in 928.

It should be noted that in the various communications, the communication middleware of the source device 901 and of the one or more other devices 903 as well as the communication hardware are involved where applicable (as described above). These are omitted for clarity.

One-to-Multiple Clipboard Synchronization

According to one-to-multiple clipboard synchronization, the user proactively identifies the users/devices to which the data will be sent.

According to one aspect of this disclosure, the user performs the following steps in one-to-multiple clipboard synchronization:

1. On the source device use any application Copy command to copy the data to the local clipboard
2. Open "Shared Clipboard Application" in source device
3. Choose one or more contacts/devices from contact list and selects the "Send Clipboard" command "Shared Clipboard Application" in source devices sends the clipboard contents to the "Shared Clipboard Application" in the destination devices, which copy the data in the local Operating System clipboard
4. On the destination device use the Paste command in any application Bluetooth/WLAN Proximity Triggered Synchronization According to Bluetooth and/or WLAN proximity triggered synchronization, Bluetooth or WLAN signal levels are used by the destination device to detect the source device from which to copy the data from.

According to one aspect of this disclosure, the user performs the following for Bluetooth/WLAN proximity triggered synchronization:
1. On source device use the application Copy command to copy the data to the local clipboard. "Shared Clipboard Application" in source device receives a copy event from Operating System clipboard. The application enables Bluetooth and/or WLAN signal transmission in the source device. It also notifies all "Shared Clipboard Application" in nearby devices a copy operation occurred. The other devices start scanning Bluetooth and WLAN reception signal levels (for a limited period of time to save battery) to detect the user approaching the source device to the destination device.
2. Approach source device to destination device. "Shared Clipboard Application" on destination device detects the device that was approached because of the increase in the Bluetooth or WLAN received signal level and it verifies it is the source device by checking the timestamp of the most recent clipboard copy operation on the approached device. "Shared Clipboard Application" in destination device copies the data from it to the local Operating system clipboard
3. On destination device use the Paste command in any application A message flow according to an aspect of this disclosure for WLAN proximity triggered synchronization is described in the following with reference to FIG. 10.

Figure 10:
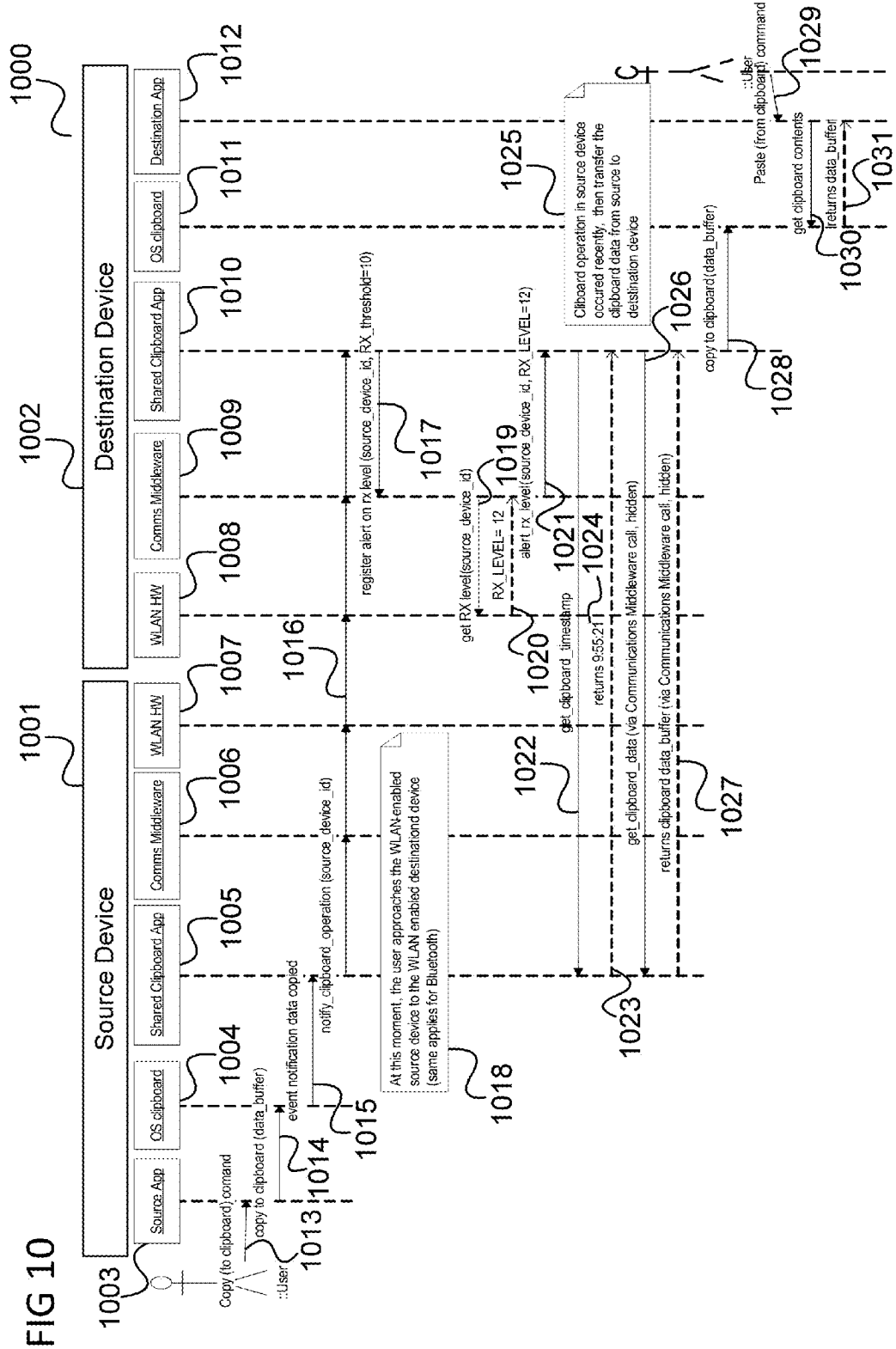
FIG. 10 shows a message flow diagram according to an aspect of this disclosure.

FIG. 10 shows a message flow diagram 1000 according to an aspect of this disclosure.

The flow takes place between components of a source device 1001, e.g. corresponding to the first computing device 501 and components of a destination device 1002, e.g. corresponding to the second computing device 502.

In more detail, the message flow takes place between a source application 1003 on the source device 1001, for example corresponding to the application 517, the operating system clipboard 1004 of the source device 1001, the shared clipboard application 1006 of the source device 1001, the communication middleware 1006 of the source device 1001, a WLAN communication hardware (e.g. a WLAN transceiver) 1107 of the source device 1001, a WLAN communication hardware (e.g. a WLAN transceiver) 1108 of the destination device 1002, the communication middleware 1009 of the destination device 1002, the shared clipboard application 1010 of the destination device 1002, the operating system clipboard 1011 of the destination device 1002 and a destination application 1012 on the destination device 1002, for example corresponding to the application 518.

In 1013, the user issues a copy command to the source application 1003. In 1014, the copied data is transferred to the source device clipboard 1004. In 1015, the shared clipboard application 1005 of the source device 1001 is notified about the copying operation.

In 1016, the shared clipboard application 1005 on the source device 1001 notifies the shared clipboard application 1010 on the destination device 1002 about the copying operation via the communication middleware 1006 and the WLAN communication hardware 1007 of the source device 1001 and the WLAN communication hardware 1008 and the communication middleware 1009 of the destination device 1002.

In 1017, the shared clipboard application 1010 of the destination device 1002 requests the communication middleware 1009 of the destination device 1002 to be alerted when the reception strength of WLAN signals of the source device 1001 exceeds a threshold. The threshold and an identification of the source device 1001 are included in the request.

It is assumed that in 1018, the user brings the source device 1001 and the destination device 1002 closer together such that the reception strength of WLAN signals of the source device 1001 at the destination device 1002 exceeds the threshold.

In 1019, the communication middleware 1009 of the destination device 1002 requests the WLAN communication hardware 1008 of the destination device 1002 to provide information about the reception strength of WLAN signals from the source device 1001. This is for example done periodically in accordance with the request by the shared clipboard application 1010 in 1017. In 1020, the WLAN communication hardware 1008 of the destination device 1002 returns an indication of the reception strength in response. Since it exceeds the threshold, the communication middleware 1009 alerts the shared clipboard application 1010.

In 1022, the shared clipboard application 1010 on the destination device 1002 requests a clipboard timestamp from the shared clipboard application 1005 of the source device 1001 and receives, in 1023, a clipboard timestamp 1024 in response.

It is assumed that in 1025, it is decided (e.g. by the shared clipboard application 910 of the destination device 1002), that the timestamp 1024 indicates that the clipboard change is recent enough to justify a copy of the clipboard content from the source device 1001 to the destination device 1002. Accordingly, in 1026, the shared clipboard application 1010 on the destination device 1002 requests the clipboard content of the source device 1001 from the shared clipboard application 1005 of the source device 1001. In 1027, the shared clipboard application 1005 of the source device 1001 transmits its operating clipboard content to the shared clipboard application 1010 of the destination device 1002.

The shared clipboard application 1010 in 1028 copies the received data into the operation system clipboard 1011 of the destination device 1002. The destination application 1012 may, upon a paste command by the user in the destination application 1012 in 1029, request the clipboard contents from the clipboard 1011 in 1030. The clipboard contents as received from the source device 1001 are then supplied to the destination application 1012 in 1031.

NFC Connection Detection Clipboard Synchronization

According to NFC connection detection clipboard synchronization a NFC connection operation to detect the source device from which to copy the data from. NFC devices can be working either in NFC read/write mode or in NFC peer-to-peer modes.

According to one aspect of this disclosure, the user performs the following in NFC connection detection clipboard synchronization:

1. On the source device use the application Copy command to copy the data to local Operating System clipboard.
2. Approach NFC-enabled source device to NFC-enabled destination device. "Shared Clipboard Application" on destination device receives an NFC connection event from the source device and checks the timestamp of the most recent clipboard operation on that device. It then copies the data from the approached device to the local Operating System clipboard
3. On destination device use the Paste command in any application A message flow according to an aspect of this disclosure for NFC connection detection clipboard synchronization is described in the following with reference to FIG. 11.

FIG. 11 shows a message flow diagram 1100 according to an aspect of this disclosure.

The flow takes place between components of a source device 1101, e.g. corresponding to the first computing device 501 and components of a destination device 1102, e.g. corresponding to the second computing device 502.

In more detail, the message flow takes place between a source application 1103 on the source device 1101, for example corresponding to the application 517, the operating system clipboard 1104 of the source device 1101, the shared clipboard application 1105 of the source device 1101, the communication middleware 1106 of the source device 1101, NFC communication hardware (e.g. a NFC transceiver) 1107 of the source device 1101, NFC communication hardware (e.g. a NFC transceiver) 1108 of the destination device 1102, the communication middleware 1109 of the destination device 1102, the shared clipboard application 1110 of the destination device 1102, the operating system clipboard 1111 of the destination device 1102 and a destination application 1112 on the destination device 1102, for example corresponding to the application 518.

In 1113, the user issues a copy command to the source application 1103. In 1114, the copied data is transferred to the source device clipboard 1104. In 1115, the shared clipboard application 1105 of the source device 1101 is notified about the copying operation.

It is assumed that in 1116, the user brings the source device 1101 in NFC reception range of the destination device 1102. In 1117, the NFC hardware 1107 of the source device 1101 initiates an NFC connection to the NFC hardware 1108 of the destination device 1102 which is established in 1118 (e.g. by a corresponding response from the NFC hardware 1108 of the destination device 1102).

In 1119, the NFC hardware 1107 of the source device 1101 informs the shared clipboard application 1105 of the source device 1101 about the connection establishment by means of the communication middleware 1106 of the source device 1101. In 1120, the NFC hardware 1108 of the destination device 1102 informs the shared clipboard application 1110 of the destination device 1102 about the connection establishment by means of the communication middleware 1109 of the destination device 1102.

In 1121, the shared clipboard application 1105 on the source device 1101 requests a clipboard timestamp (i.e. an indication of the last change of the operating system clipboard) from the shared clipboard application 1110 of the destination device 1102 and receives, in 1122, a first clipboard timestamp 1123 in response.

It is assumed that in 1124 it is detected by the shared clipboard application 1105 on the source device based on the first timestamp 1123 that the last clipboard change by the destination device is not sufficiently recent to justify a transfer of the clipboard content from the destination device.

In 1125, the shared clipboard application 1110 on the destination device 1102 requests a clipboard timestamp from the shared clipboard application 1105 of the source device 1101 and receives, in 1126, a second clipboard timestamp 1127 in response.

It is assumed that in 1128 it is detected by the shared clipboard application 1110 on the destination device 1102 based on the second timestamp 1127 that the last clipboard change by the destination device 1101 is sufficiently recent to justify a transfer of the clipboard content from the source device 1101.

Accordingly, in 1129, the shared clipboard application 1110 on the destination device 1102 requests the clipboard content of the source device 1101 from the shared clipboard application 1105 of the source device 1101. In 1130, the shared clipboard application 1105 of the source device 1101 transmits its operating clipboard content to the shared clipboard application 1110 of the destination device 1102.

The shared clipboard application 1110 in 1131 copies the received data into the operation system clipboard 1111 of the destination device 1102. The destination application 1112 may, upon a paste command by the user in the destination application 1112 in 1132, request the clipboard contents from the clipboard 1111 in 1133. The clipboard contents as received from the source device 1101 are then supplied to the destination application 1112 in 1134.

Peer-to-Peer Shared Bulletin Board

According to one aspect of this disclosure, a shared bulletin board is used as a user interface belonging to the shared clipboard application. It enables two or more computing devices to cut and paste text and images into a virtual bulletin board such that the board contents are identical as viewed on multiple devices. The user can move URLs, phone numbers, email addresses, text, or pictures or any digital data among/between their different devices. The shared bulletin board user interface is content-aware and can locate actionable strings therein (e.g., phone numbers, URLs, addresses, GPS locations) and link these items to appropriate applications (e.g., opens Skype to handle a phone number). The user can set up multiple shared bulletin boards which are independent and only visible to certain devices or contacts. The bulletin board maintains a history of the last copied contents (clips).

According to one aspect of this disclosure, the user performs the following steps to setup a shared bulletin board:

1) The user opens the shared clipboard application on one of his devices
2) The user selects a device from the list of nearby devices. On the selected device, he receives a notice of an invitation to share a common bulletin board which he accepts. Alternatively, the relationship can be initiated using NFC pairing for those devices that support it. In addition the shared bulletin board might automatically prompt the user to set up a shared bulletin board with those devices the user has marked for special status and access privileges.

According to one aspect of this disclosure, the user performs the following to transfer data with the shared bulletin board user interface:

1) On the source device the users uses the application copy command to copy the data to source device operating system clipboard. Then in the shared bulletin board user interface the user uses the paste command to copy the data in the bulletin board. Alternatively the user can drag-and-drop data from the application into the shared bulletin board user interface. The content of the bulletin board is automatically synchronized to all devices accessing the same shared bulletin board.

2) On the destination device(s), the user opens the shared bulletin board user interface.
3) On the destination device, now the user has several options:
   3a) the user directly clicks on the clip which will trigger an action (open URL in browser, make phone call, open SMS editor, open Map application, etc.)
   3b) the user drags-and-drop the clip from the shared bulletin board user interface into the destination application
   3c) the user copies the clip in the local operating system clipboard. The user opens the destination application and pastes the data.

FIGS. 12A and 12B show user interfaces 1201, 1202 according to an aspect of this disclosure.

FIG. 12A illustrates the user interface 1201 of the shared bulletin board as it is for example shown on a desktop computer and FIG. 12B illustrates the user interface 1202 as it is for example shown on a mobile device (such as a smartphone of tablet computer).

The user interfaces 1201, 1202 show a plurality of content items 1203. The user interface 1202 as used for a mobile device in this example shows a pop-up menu 1204 for actions based on metadata of a content item which may be selected for the content item (google maps link in this example).

Cloud Shared Bulletin Board

The same bulletin board application as described in the peer-to-peer shared bulletin board above can use a cloud architecture to transport the data and store the data for some period of time. The usage of a cloud allows that the devices using the bulletin board do not need to be switched on at the same time. It is possible to copy data from one device to the cloud, then switch off the source device, and several hours later on another device retrieve the data from the cloud.

An architecture for a cloud shared bulletin board may be as described with reference to FIG. 5, wherein instead of the communication connection 521 between the two computing devices 501, 502, the two computing device 501, 502 are each coupled by means of a communication connection to a computing cloud, e.g. to one or more server computers (also referred to as cloud servers), e.g. in the Internet, wherein the two computing devices 501, 502 do not need to be coupled to the computing cloud at the same time.

According to one aspect of this disclosure, the user performs the following to transfer data using the cloud shared bulletin board:

1) Open the shared bulletin board application on one of his computing devices (source device)
2) Copy or drag-and-drop data from the source application to the shared bulletin user interface in the source device. The data is transferred by the shared clipboard application to the cloud servers
3) Later (could be immediately, hours or days) the user opens the shared clipboard application on another of his computing devices (destination device). Then (similarly as in the peer-to-peer case) the user copies the data to the local operating system clipboard and pastes the data, or drags-and-drops the data to the destination application or directly clicks on the data triggering the launch of an application Various aspects of this disclosure for exchanging clipboard data between two devices as for example described above may have the following features:

The integration with Operating System clipboard may be automatic. Thus, user intervention may not be required to move data from the operating system clipboard to the shared clipboard application and vice versa.

The user may not have to manually setup a connection between the two devices (such as a Bluetooth pairing or a WLAN connection). The communication middleware simplifies the peer-to-peer connection.

Aspects of this disclosure may support an automatic synchronization mode.

Aspects of this disclosure may support a semiautomatic mode that automatically detects the source device where to copy from.

Aspects of this disclosure may support a Bluetooth/WLAN proximity triggered synchronization.

Aspects of this disclosure may support NFC support, e.g. support a NFC connection detection triggered synchronization.

Aspects of this disclosure may provide a Bulletin Board working on peer-to-peer mode which thus does not require access to a server.

A mechanism for clipboard content transfer (e.g. for clipboard synchronization) is provided which is integrated with the operating system clipboard. The number of steps the user has to take to get the data from an application in the source device to the application in the destination device is reduced. Where automatic clipboard synchronization is used, the mechanism only requires to copy the data into the operating system clipboard in the source device and paste it in the destination device application. The mechanism can work in a peer-to-peer setup without a need of a central server and ensure security and privacy encrypting the data. Further, according to one aspect of this disclosure, no temporary files or messages are created so the user does not need to delete them.

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for transferring data from a first device to a second device, the method comprising:
    writing data into a data-sharing application of an operating system of the first device;
    requesting a data-sharing application to select a physical layer data transmission technology;
    the data-sharing application selecting a physical layer data transmission technology;
    connecting a data-sharing application of an operating system of the second device via the selected physical layer data transmission technology; and
    transferring the data from the data-sharing application of the first device to the data-sharing application of the second device.

2. The method according to claim 1, wherein the data is transferred from the data-sharing application of the first device to the data-sharing application of the operating system of the second device via the selected physical layer data transmission technology.

3. The method according to claim 1, wherein the data-sharing application includes a middleware component configured to select the physical layer data transmission technology.

4. The method according to claim 1, wherein the data-sharing application includes a data-sharing interface for receiving the data from the data-sharing application of the operating system of the first device.

5. The method according to claim 1, wherein the data is written into the data-sharing application of the operating system of the first device by a software application running on the first device.

6. The method according to claim 1, wherein the data is written into the data-sharing application of the operating system of the first device in response to an instruction by a user of the first device.

7. The method according to claim 6, wherein the operation is a copy or a cut instruction.

8. The method according to claim 1, wherein the first device and the second device are communication terminals.

9. The method according to claim 1, wherein the first device and the second device are mobile communication terminals.

10. The method according to claim 1, wherein the physical layer data transmission technology is selected from a plurality of physical layer data transmission technologies supported by the first device.

11. The method according to claim 1, wherein the physical layer data transmission technology is selected as a physical layer data transmission technologies supported by the second device.

12. The method according to claim 1, wherein a communication connection between the first device and the second device is established based on the selected physical layer data transmission technology.

13. The method according to claim 1, wherein the physical layer data transmission technology is a wireless physical layer data transmission technology.

14. The method according to claim 1, wherein the physical layer data transmission technology is a wired physical layer data transmission technology.

15. The method according to claim 1, wherein the data-sharing application of the operating system of the second device is connected via a communication connection based on the selected physical layer data transmission technology.

16. The method according to claim 15, wherein the communication connection is a peer-to-peer communication connection.

17. The method according to claim 1, further comprising detecting whether the signal strength of a signal received from the second device is above a predetermined threshold and performing the connecting and the transferring steps if it has been detected that the signal strength of above the predetermined threshold.

18. The method according to claim 1, further comprising determining the second device from a list of second devices.

19. The method according to claim 1, further comprising performing the requesting, selecting, connecting and transferring for each of a plurality of second devices.

20. The method according to claim 1, wherein the physical layer data transmission technology is a Personal Area Network physical layer data transmission technology, a Local Area Network physical layer data transmission technology or a Wide Area Network physical layer data transmission technology.

21. The method according to claim 1, wherein the data-sharing application comprises a bulletin board shared between the first device and the second device.

22. The method according to claim 1, wherein the data-sharing application is implemented in a device architecture layer above the operating system of the first device.

23. Device comprising:
an operating system installed on the device;
a data source configured to write data into a data-sharing application of the operating system of the device;
a data sharing application;
a controller configured to initiate a request for the data sharing application to select a physical layer data transmission technology;
a communication middleware configured to connect a data sharing application of an operating system of another device via the selected physical layer data transmission technology; and
a transceiver configured to transfer the data from the data sharing application of the first device to the data sharing application of the second device.

24. The device according to claim 23, wherein the transceiver is configured to transfer the data from the data-sharing application of the device to the data-sharing application of the operating system of the other device via the selected physical layer data transmission technology.

25. The device according to claim 23, wherein the data-sharing application includes a middleware component configured to select the physical layer data transmission technology.

26. The device according to claim 23, wherein the data-sharing application includes a data-sharing interface for receiving the data from the data-sharing application of the operating system of the device.

27. The device according to claim 23, further comprising a software application running on the device configured to write the data into the data-sharing application of the operating system of the device.

28. The device according to claim 23, further comprising an input device configured to receive an instruction by a user of the device, wherein the data is written into the data-sharing application of the operating system of the device in response to the reception of the instruction from the user.

29. A method for receiving data from a first device by a second device, the method comprising:
requesting a data-sharing application to select a physical layer data transmission technology;
the data-sharing application selecting a physical layer data transmission technology;
connecting the data-sharing application of the second device via the selected physical layer data transmission technology to a data-sharing application of an operating system of the first device;
receiving data from the data-sharing application of the operating system of the first device and
writing the received data to the data-sharing application of the operating system of the second device.

30. Device comprising:
an operating system installed on the device;
a data-sharing application;
a controller configured to initiate a request for the data-sharing application to select a physical layer data transmission technology;

a communication middleware configured to connect the data-sharing application of the device via the selected physical layer data transmission technology to a data-sharing application of an operating system of another device;
a receiver configured to receive data from the data-sharing application of the operating system of the other device and to write the received data to the data-sharing application of the operating system of the device.

* * * * *